Oct. 21, 1924.
B. E. SMITHERS ET AL
1,512,370
BELT FASTENER
Filed Oct. 29, 1923
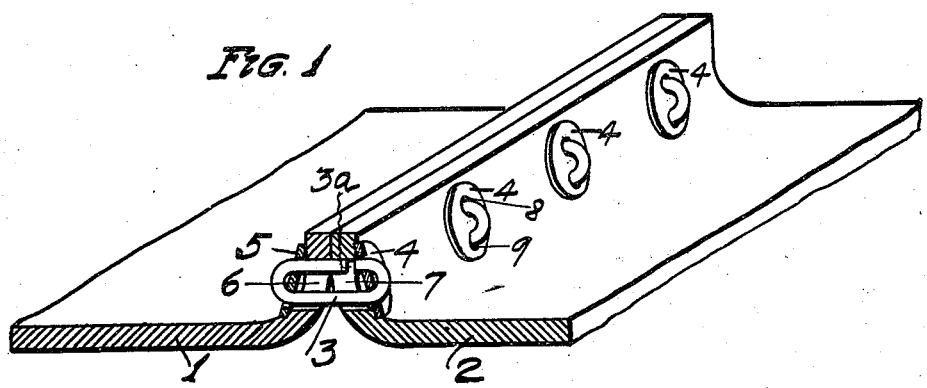
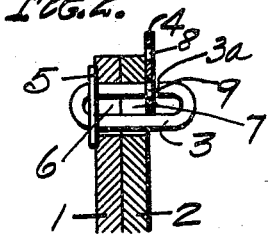 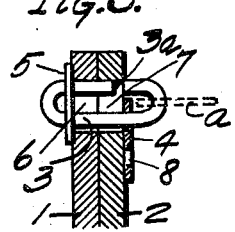 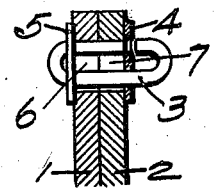
 
INVENTORS
BETHEL E. SMITHERS
LOUIS B. JONES
by J. H. Weatherford
ATTORNEY Patented Oct. 21, 1924.

1,512,370

UNITED STATES PATENT OFFICE.

BETHEL E. SMITHERS AND LOUIS B. JONES, OF HOLLYWOOD STATION, TENNESSEE.

BELT FASTENER.

Application filed October 29, 1923. Serial No. 671,337.

*To all whom it may concern:*

Be it known that we, BETHEL E. SMITHERS and LOUIS B. JONES, both citizens of the United States, and residents of Hollywood Station, in the county of Shelby and the State of Tennessee, have invented certain new and useful Improvements in Belt Fasteners, of which the following is a full, clear, and exact description, such as will enable anyone skilled in the art to make and use the same.

Our invention relates to an improvement in fastening devices for connecting the ends of a driving belt into a continuous belt and has for its object an improved construction adapted to be quickly applied to or disconnected from a belt which when applied will hold the belt in such a manner that it can travel over a pulley without unjoining the fasteners. Our invention therefore consists in the construction, arrangement and combination of parts which will be hereinafter pointed out in the drawings, specifications and claims.

In the accompanying drawings;

Fig. 1 is a sectional perspective showing the two ends of a belt joined together by a plurality of our fasteners.

Fig. 2 is a section of the two ends of the belt showing the first stage of the fastener being applied.

Fig. 3 is a similar section showing the second step in applying the fastener and Fig. 4 is a similar section showing the third step. (Fig. 1 before referred to, shows the final step with the fastener in place.)

Fig. 5 is a view of the fastener, and

Fig. 6 is a modified form of washer.

Referring now to the drawings in which the various parts are indicated by the same numerals in all the views, 1, 2 represent the two ends of a belt which it is desired to join together; 3 is a fastener link; 4 and 5 are washers; 6 and 7 are slots respectively in the ends 1 and 2. These slots are in each belt end, one of them being provided in each belt end for each link which it is desired to use, the spacing of the slots being necessarily the same in the belt ends 1 and 2 so that the corresponding slots register with each other.

Each of the links are in the shape of an elongated letter C having the longer sides parallel and with the opening $3^a$ in one side preferably centrally located though if desired it may be closer to one end than to the other. These links are preferably made by bending a wire of the desired size and length into the desired form. The opening $3^a$ is preferably slightly greater than the thickness of one of the washers 4 or 5 which are to be used in connection with the link. The length of the link, the width of the same and the weight of the metal of which it is made, are necessarily governed by the thickness of the belt with which the links are to be used. The links are preferably made however so that the lengths of the longer section of the open side of the link when unequal sections are used, or of each section in the preferred form, is just equal to the thickness of the two belt ends which are to be joined plus the thickness of one washer; whereby when the link is inserted through the slot in the two belts as shown in Fig. 2 the opening in the link will be in position to receive the other washer.

In joining the ends of a belt together the two ends of the belt are first cut square across of the desired length and the ends are brought together flat as shown in Figs. 2, 3 and 4. Slots 6 and 7 are then cut through the two belts so that they register exactly, the width of the slot transversely of the belt being substantially the thickness of the metal of which the link is made and the length of the slot longitudinally of the belt being slightly greater than the width of the link. The row of slots across the ends of the belt is parallel to the end of the belt so that the slots are therefore necessarily at equal distances from the said ends. It is preferable also that the slots be spaced equal distances apart so that each link will have its full share of the work to be done. When the slots have been cut a washer 5 is placed on one end of the link and the link is slipped through the slot 6—7 in the two belt ends as shown in Fig. 2, the two ends being held firmly together. When this is done the location of the opening $3^a$ of the link is preferably such that it will just come through the two belts. The washer 4 is then slipped into place as shown in Fig. 2, is turned outward to the dotted position $a$ of Fig. 3 and continuing to the final position in which it is shown in Fig. 4 and when in such position the belt ends at this point are released and allowed to spread, ordinarily engaging the opposite portion of the link in the hole 8 in the washer. When all the links are in position the belt ends are drawn apart as shown in Fig. 1 and the belt is ready for use.

It will be noted that each of the washers 4 and 5 are provided with two holes 8 and 9 which are slightly larger than the metal of which the link is made and which are spaced apart to conform to the width of the link and enable them to be easily placed thereon. In Fig. 6, I show a modified form of washer in which an open slot 10 replaces the hole 9. This form of washer may of course be placed without rotation.

Especial attention is directed to the fact that the slot $3^a$ when formed off center or nearer one end of the link than the other permits the placing of the washer 4 with a minimum length of link. It will also be noted that when the belt is in use, the slot $3^a$ lies within the slot in the belt ends and effectively prevents the washer 4 from coming loose. It will be noted too, that any strain when the pull comes on the belt ends, when in use, tends to shape the washers to the curve of the belt which prevents the washers 4 and 5 cutting into the surface of the belt and to a large extent does away with that strain on the edge of the slot itself which otherwise would have a tendency to tear out the slots. It will also be noted that the strain of use is distributed over the washer rather than concentrated at a single point so that the action is less severe on the belt than in some other forms of fasteners. The fasteners being individual, slight inequalities in spacing are not material, though as before stated, it is preferable that the spacing should be substantially regular.

The links may be made of round wire or of metal of square or other cross sections. The washers may be circular or of any desired shape. They may be flat as shown or the edge may be curved away from the belt if that should be desired.

Having now fully described our invention, what we claim and desire to secure by Letters Patent in the United States is:—

1. In a belt fastener, an elongated C shaped link having substantially parallel sides, and two washers adapted to coact therewith, each of said washers having openings spaced apart to conform to the spacing of the said sides, the open side of said link having an opening only slightly greater than the thickness of said washers.

2. In a belt fastener, an elongated C shaped link having substantially parallel sides, and two washers adapted to coact therewith; each of said washers having openings spaced apart to conform to the spacing of the said sides, the opening in said open side being only slightly greater than the thickness of said washers and being disposed laterally closer to one end of said link than to the other.

3. In a belt fastener, an elongated C shaped link having substantially parallel sides, which sides are of greater length than the double thickness of belt, and two washers adapted to coact with said link, each of said washers having openings spaced apart to conform to the spacing of the said sides, the open side of said link having one straight section equal in length to the thickness of the two belts and one washer, and one shorter straight section.

In testimony whereof we have hereunto set our names.

BETHEL E. SMITHERS.
LOUIS B. JONES.

Witnesses:
L. E. PRUETT,
W. H. LENAHAN.